(12) United States Patent
Barcellona

(10) Patent No.: US 7,917,890 B2
(45) Date of Patent: Mar. 29, 2011

(54) ENTERPRISE-SCALE APPLICATION DEVELOPMENT FRAMEWORK UTILIZING CODE GENERATION

(76) Inventor: Jon Barcellona, Flower Mound, TX (US)

( * ) Notice: Subject to any disclaimer, the term of this patent is extended or adjusted under 35 U.S.C. 154(b) by 1154 days.

(21) Appl. No.: 11/469,007

(22) Filed: Aug. 31, 2006

(65) Prior Publication Data

US 2008/0127040 A1 May 29, 2008

(51) Int. Cl.
*G06F 9/44* (2006.01)
(52) U.S. Cl. ......................... 717/106
(58) Field of Classification Search .................... 717/106
See application file for complete search history.

(56) References Cited

U.S. PATENT DOCUMENTS

| | | | | |
|---|---|---|---|---|
| 5,875,331 A * | 2/1999 | Lindsey | ......................... | 717/108 |
| 6,018,627 A | 1/2000 | Iyengar et al. | | |
| 6,381,743 B1 | 4/2002 | Mutschler, III | | |
| 6,601,233 B1 * | 7/2003 | Underwood | .................. | 717/102 |
| 6,748,588 B1 * | 6/2004 | Fraser et al. | .................. | 717/146 |
| 6,996,799 B1 * | 2/2006 | Cismas et al. | ................ | 717/106 |
| 7,080,350 B2 * | 7/2006 | Saimi et al. | ..................... | 717/100 |
| 7,137,100 B2 * | 11/2006 | Iborra et al. | ................... | 717/106 |
| 7,721,253 B2 * | 5/2010 | Tatsumi et al. | ................ | 717/106 |
| 7,774,746 B2 * | 8/2010 | Mansfield et al. | ............ | 717/106 |
| 2003/0158760 A1 * | 8/2003 | Kannenberg | ...................... | 705/4 |
| 2003/0167456 A1 * | 9/2003 | Sabharwal | ..................... | 717/108 |
| 2004/0015832 A1 * | 1/2004 | Stapp et al. | ................... | 717/106 |
| 2005/0229154 A1 * | 10/2005 | Hiew et al. | ..................... | 717/110 |
| 2007/0016889 A1 * | 1/2007 | Miyazaki | ....................... | 717/106 |

OTHER PUBLICATIONS

Roover et al., "Incorporating Dynamic Analysis and Approximate Reasoning in Declarative Meta-Programing to Support Software Re-engineering", University of Brussel, May 2004, pp. 1-123.*
Voelter, "A Catalog of Pattens for Program Generation", EuroPlop'2003, Apr. 14, 2003, available at: http://www.voelter.de/data/pub/ProgramGeneration.pdf, pp. 1-33.*

* cited by examiner

*Primary Examiner* — Wei Y Zhen
*Assistant Examiner* — Chih-Ching Chow

(57) ABSTRACT

A method, computer program product, and data processing system for managing and automating the development of large-scale software systems are disclosed. A preferred embodiment allows for the creation of a metamodel defining the functionality and structure of a software system. The metamodel may be defined according to input from developers or analysts. Additionally, database schemata, web services definitions, and other pertinent legacy metadata may be automatically imported into the metamodel to facilitate compatibility and/or functional comparability with legacy software systems. Specifications contained within the metamodel are then mapped to one or more code generation strategies. The code generation strategies identify and/or define patterns for the generation of source code that implements the specifications and behavior in the metamodel. Source code is generated according to the code generation strategies, which may then be modified as needed by a human programmer, and compiled into one or more executable applications.

41 Claims, 12 Drawing Sheets

ENTERPRISE-SCALE APPLICATION DEVELOPMENT FRAMEWORK UTILIZING CODE GENERATION

BACKGROUND OF THE INVENTION

1. Technical Field

The present invention relates generally to the field of Computer-Aided Software Engineering (CASE), and more specifically to technology for managing and automating the development of large-scale software applications.

2. Description of the Related Art

"Software engineering" is the practice of software development as an industrial discipline. The goal of software engineering is to produce high-quality, maintainable software through an efficient use of development resources. As a field of study, software engineering may be thought of as the intersection between computer science and industrial engineering, as software engineering is as much concerned with the process of creating and maintaining software as it is with the product itself. The "software lifecycle" is a general term that is used to denote the overall process of creating, using, and maintaining a software product.

Although software engineering research often involves the use of scientific methods and mathematical models to attempt to understand the software lifecycle, the practice of software engineering is best regarded as an art. As an art, current software engineering practice is characterized by a significant number of competing software development methodologies and techniques, which, with a bit of imagination, could be analogized to different movements or styles in the visual arts and in music.

Some of these methodologies have matured to the point that they have become a lasting influence on the way developers view software and software development—they have become "classics" in their field. Many of the earliest advancements in software design involved the organization of program instructions into modular units. Structured programming, which involves structuring program code into hierarchical structures to avoid jump or "goto" statements, is now reflected in the design of almost all computer languages in common use today. Object-oriented programming, which treats programming as the creation of systems of self-contained "objects" of data and code, is another dominating force in contemporary software design. Unified Modeling Language (UML), a standard notation for modeling systems that is based on object-oriented programming principles, is the culmination of a long evolution in software modeling and appears likely to have a lasting influence on software engineering in the years ahead. Object-oriented programming is intended, among other things, to facilitate code reuse and readability by establishing that certain features in a program (classes, objects, functions, etc.) are generalizations or specializations of other program features. Many modern computer languages, such as Smalltalk, C++, C# (pronounced "C Sharp"), and Java®, explicitly support object-oriented design concepts.

Other software engineering paradigms have focused not only on the organization of program code, but have focused on the semantics (i.e., the formal meaning) of the code itself. Declarative programming is one such paradigm. Declarative program code is written so as to resemble the code's denotational semantics (i.e., the result the code is intended to produce), as opposed to its operational semantics (i.e., the series of actions taken to produce the result). Declarative programming can greatly simplify the task of writing complex programs, because it is usually more intuitive for a programmer to describe a program in terms of what result is desired, rather than in terms of individual steps. Functional programming languages (e.g., ML, Scheme, and Haskell) and logic programming languages (e.g., Prolog, Mercury) are intended exploit the declarative paradigm by defining programs as compositions of functions, as logical statements, or as rules. Declarative programs are often very concise, and for this reason, many of the more recently-developed scripting languages used for rapid application development (e.g., Perl, Python) borrow certain features from functional programming languages (e.g., "foreach" loops, "map" instructions, etc.), even if they are not functional languages in a strict sense. Because well-written declarative programs are usually shorter and more readable than their imperative counterparts, they tend to be less prone to defects (bugs) and more efficient to write.

Despite their expressiveness and convenience, declarative programming languages do not yet enjoy the widespread acceptance that conventional imperative languages do. This is partly due to the fact that historically, implementations of these languages have tended to emphasize theoretical purity and elegance over execution performance, and partly due to the fact that functional and logic programming languages often appear quite foreign to programmers accustomed to more traditional procedural and object-oriented programming languages, many of which were based on earlier procedural languages (e.g., C++ is a superset of C, and Java® and C# are based on C++).

One declarative programming technique that has enjoyed widespread acceptance, however, is in the area of markup languages, such as HyperText Markup Language (HTML) and extensible Markup Language (XML). While markup languages, per se, are not programming languages in the usual sense—they might be better characterized as "data organization languages"—the technique of embedding executable code into markup language documents has become commonplace, especially on the World Wide Web. This may be rightfully be characterized as a form of declarative programming, since the organization (or appearance, in the case of HTML) of such a document itself is expressed directly through the plain text and markup tags making up the markup-language portion(s) of the document and only the embedded executable code portion(s) of the document are made up of imperative commands. This approach has seen wide acceptance in the area of server-side scripting languages for web development, such as PHP, ASP (Active Server Pages), and JSP (Java® Server Pages), which embed executable code within specialized markup tags that, when executed by a web server, are replaced by output generated by the embedded code (if any) before the page is transmitted to the web client.

One technique that allows one to take advantage of many of the benefits of the declarative approach without having to adopt an unconventional programming language is commonly referred to as "code generation." A "code generator" is a program that takes a high-level description of all or part of a computer program and generates source code from that description. Code generators are thus conceptually similar to compilers or assemblers, but, unlike compilers or assemblers (which produce object code from source code or assembly code), code generators are used to produce source code for subsequent processing by a compiler or interpreter.

Many modern code generators, such as those introduced in conjunction with Microsoft Corporation's Software Factories Initiative, generate source code using markup-language templates, which resembles server-sides scripts written in ASP or PHP in that they embed executable code in special markup language tags. When the template is applied, the special markup language tags are replaced with results computed by the embedded code. The primary difference between these code generator templates and server-side embedded scripts is that the embedded code is embedded into a program source code file rather than a markup language document. The embedded code used by these generator templates will almost always accept some kind of input parameter that will direct the embedded code's modification of the template to form end-product source code. The ultimate effect of these modern template-based code generators is to establish a dichotomy between what might be characterized as "compile-time code" (i.e., code executed during compilation of the software) and "run-time code" (i.e., the final product of compilation). Some programming languages, most notably Forth, have built-in support for code having differing compile-time and run-time semantics, but they have not acquired the degree of acceptance enjoyed by languages in the C/Algol family, for various reasons.

In general, however, existing code generators have tended to be tailored for use by an individual programmer for the purpose of reducing that programmer's need to perform repetitive or tedious tasks, such as building user interface components, lexical analyzers, and parsers, which are very tedious to code by hand. The "Lex" and "Yacc" compiler generation tools originally developed for the UNIX operating system are examples of such code generators. In a large-scale programming project involving a team of participants, however, this kind of small-scale code generation, while helpful, does little to enhance the ability of the participants to function together as an efficient team. Research in the software engineering field has indicated that the ability of the participants in a software engineering project to function together efficiently as a team is often the driving factor in the project's overall productivity.

What is needed, therefore, is a framework for managing and (at least partially) automating the development of large-scale software systems. The present invention provides a solution to this and other problems, and offers other advantages over previous solutions.

SUMMARY OF THE INVENTION

Accordingly, the present invention provides a method, computer program product, and data processing system for managing and automating the development of large-scale software systems. A preferred embodiment of the present invention allows for the creation of a metamodel defining the functionality, logical structure, and requirements of a software system. This metamodel is independent of any particular technology or implementation. The metamodel may be defined according to input from developers, analysts or subject matter experts. Additionally, database schemata, web services definitions, design diagrams, functional design specifications, legacy metadata and other pertinent legacy digital assets may be automatically imported into the metamodel as functional specifications to facilitate compatibility and/or functional comparability with legacy software systems. Specifications contained within the metamodel are then mapped to one or more code generation strategies. The code generation strategies identify and/or define patterns for the generation of source code that implements the specifications in the metamodel. Contained within these code generation strategies are the behavior patterns associated with the mapped technology or implementation. The software system is created by generating source code according to the code generation strategies, which may then be modified as needed or desired by a human programmer, and compiled into one or more executable applications. This logical separation between the metamodel and the code generation strategies represents the separation of the requirements and functional specification from the technical specification and implementation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
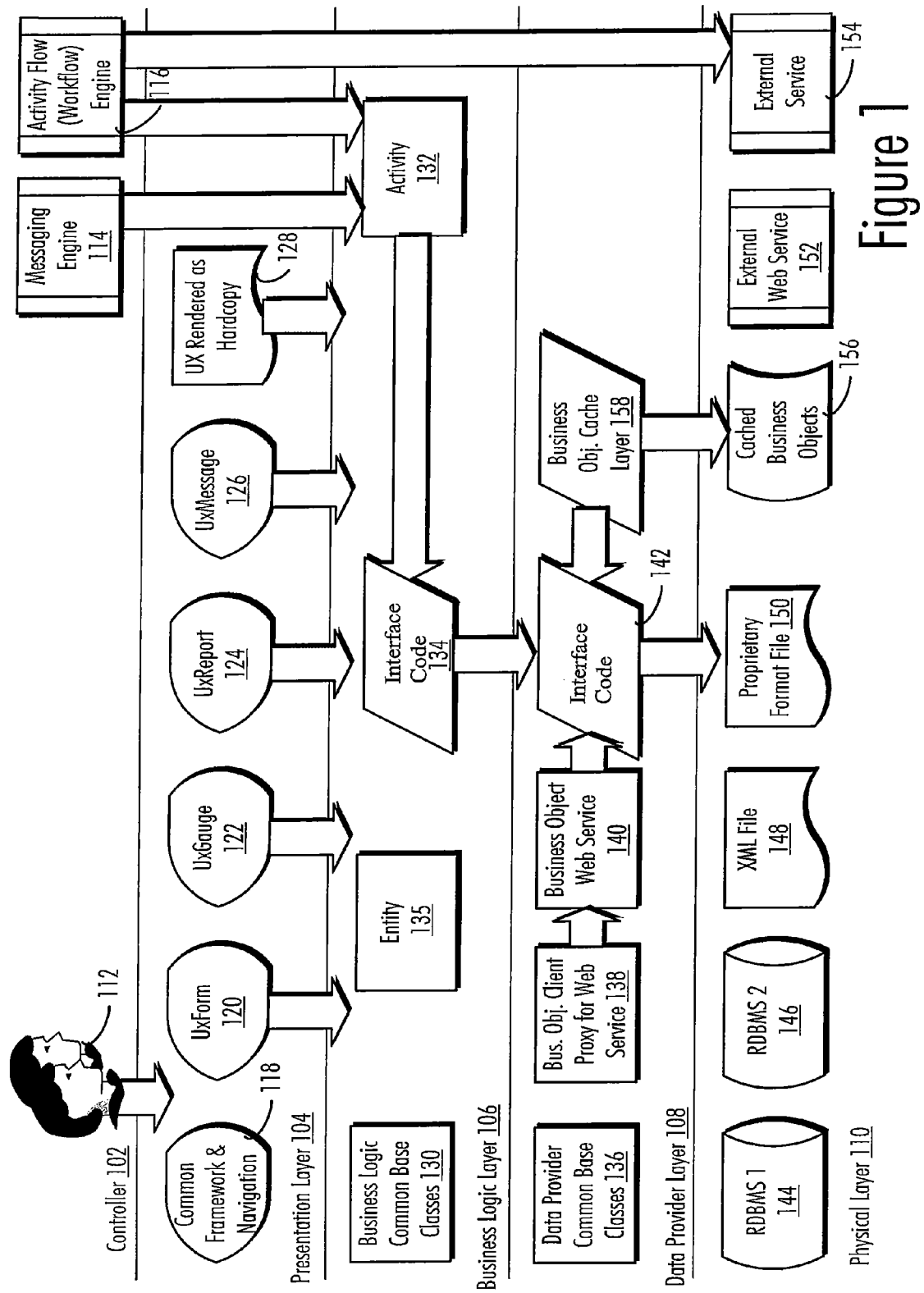
FIG. 1 is an architectural diagram of an enterprise software system in accordance with a preferred embodiment of the present invention.

FIG. 1 is an architectural diagram of a large-scale software system developed in accordance with a preferred embodiment of the present invention. That is to say that FIG. 1 represents the desired end-product that the software development technology described herein in intended to produce. Later figures illustrate the operation of the software development technology itself, but it is helpful to first consider the end-product system in order to more fully and easily understand the software development technology.

The software system shown in FIG. 1 is conceptually and architecturally divided into a number of tiers or layers of functional abstraction: a controller layer 102, a presentation layer 104, a business logic layer 106, a data provider layer 108, and a physical layer 110. Controller layer 102 comprises those actors that direct the operation of the system as a whole. Inasmuch as a software system may be thought of as a symbiotic man-machine system, the human users of the system may be considered to be part of controller layer 102. Also included in controller layer 102 are a messaging engine 114, which directs the system's response to an external message, and an activity flow engine 116, which directs the system through the steps of an activity flow.

Activity Flows describe the flow or progress of work done by the software product. These flows depend on activities (e.g., activity 132 in business logic layer 106) for each step in the flow and may be both conditional and long-running in nature. There are three basic types of activity flows in a preferred embodiment of the present invention, which are described in more detail further below. An activity is a unit of business logic that is contained within a software product. It may be executed directly by a program or incorporated as a step in an activity flow.

Presentation layer 104 is the portion of the software system responsible for providing output to (or receiving input from) a human user. As with other layers of the complete software system, a common framework of code 118 is provided to support commonly-performed user interface tasks. Other components of presentation layer 104 (referred to as "user interactions," which is abbreviated as "Ux" in the figures) are custom-generated in accordance with a preferred embodiment of the present invention. There are four basic types of user interaction generated for inclusion in presentation layer 104:

1) Messages. Messages are communications that are delivered to the user either via publish-subscribe point-to-point delivery, message queue, or other asynchronous delivery.
2) Forms. Forms are encapsulated data entry interactions between the user and the software product. These user interactions may be implemented through traditional mechanisms such as Web, Windows, or Smart Device, but are not restricted from employing non-traditional interfaces or devices. The only required components are (a) zero or more data entry events followed by (b) one or more execution events.
3) Reports. Reports are interactive presentations of data with drill-down or activity flow execution events. Reports may provide their initial presentation based on predefined or ad hoc criteria. Text, graphical or other media components of a report may contain zero or more execution events.
4) Gauges. Gauges are automatically-refreshing presentations of data that support drill-down, activity flow and notification execution events. Gauges provide their initial presentation based on predefined criteria and cycle event times. Gauges may be associated with "message" user interactions for automatic user notification.

Business logic layer 106 provides the basic business-related functionality of the software system—i.e., it is where business rules and processes are defined and implemented. Activities 132, as defined above, and entities 135 form the bulk of business logic layer 106. Entities, which are discussed in more detail below, are used to group related business data together. As with presentation layer 104, business logic layer 106 also has a set of common base classes 130 defined for performing common tasks and sub-tasks. Business logic layer 106 also contains interface code 134 for interacting with data provider layer 108.

Data provider layer 108 provides low-level data management functions to the software system, providing an interface to data storage and other support infrastructure contained within physical layer 110. In addition to common base classes 136, data provider layer 108 provides a web service interface 140 to allow external systems to access the system as a web service and a client proxy 138 to enable the system to access its own web service (web service 140). The bulk of data provider layer 108, however, is made up of interface code 142 for interacting with the data repositories and external services that make up physical layer 110.

In this example physical layer 110 is shown containing relational database management systems (RDBMSs) 144 and 146 from various vendors as well as other forms of data repositories, such as an XML file 148 or any other (possibly proprietary) data storage format 150. Cache storage 156 is provided for use by data provider layer 108 (object cache code 158) to allow the software product to operate as a "smart client," which allows the software to be operated offline (i.e., when disconnected from the server) and also allows the software to avoid making repetitive high-overhead requests to database servers and other shared resources. Finally, any external web services 152 or other external services 154 the software system interacts with are contained within physical layer 110. External services 154 are units of business logic or capability that are external to the software product or that must be treated as an isolated component.

Figure 2:
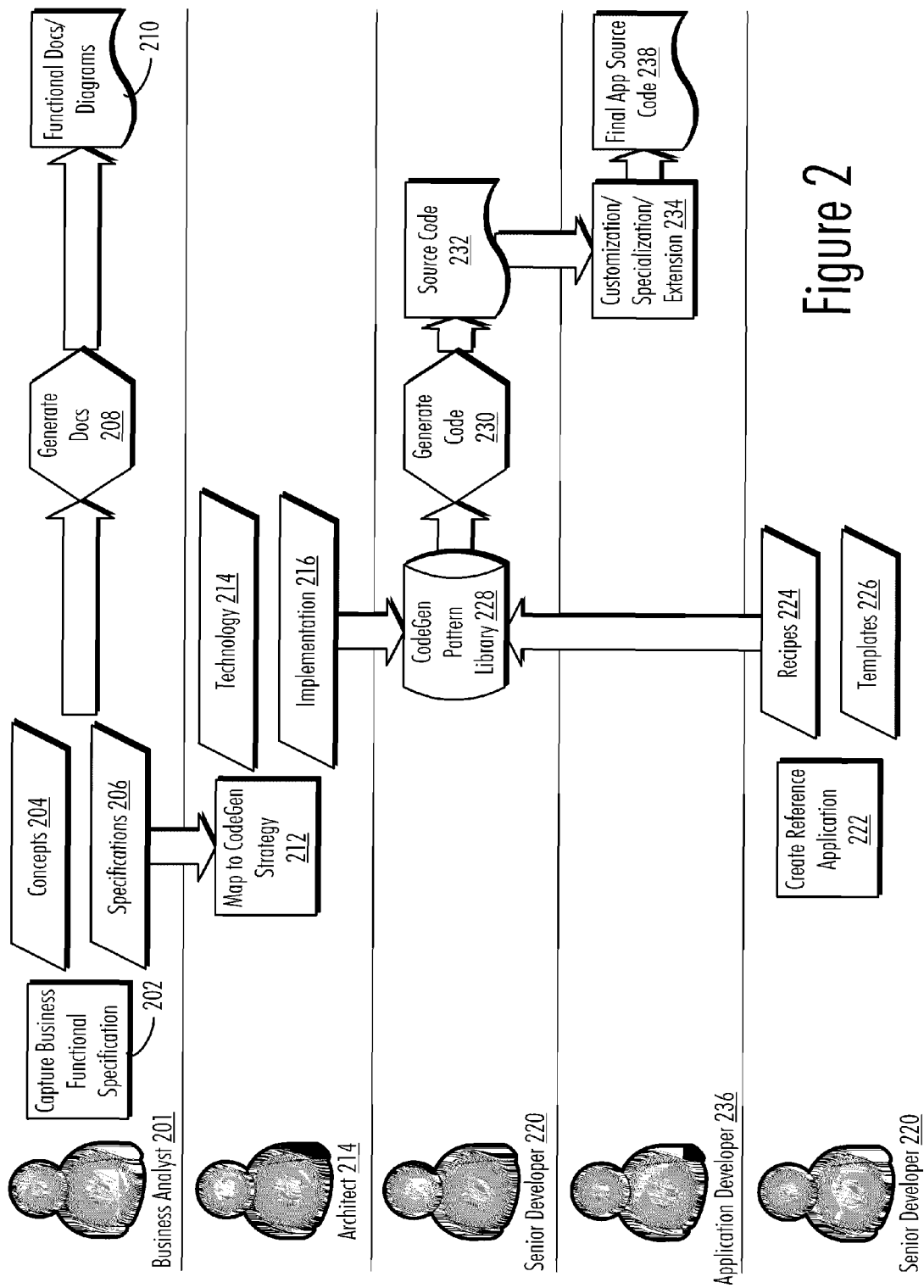
FIG. 2 is a diagram of the process of developing a software system in accordance with a preferred embodiment of the present invention.
Figure 3:
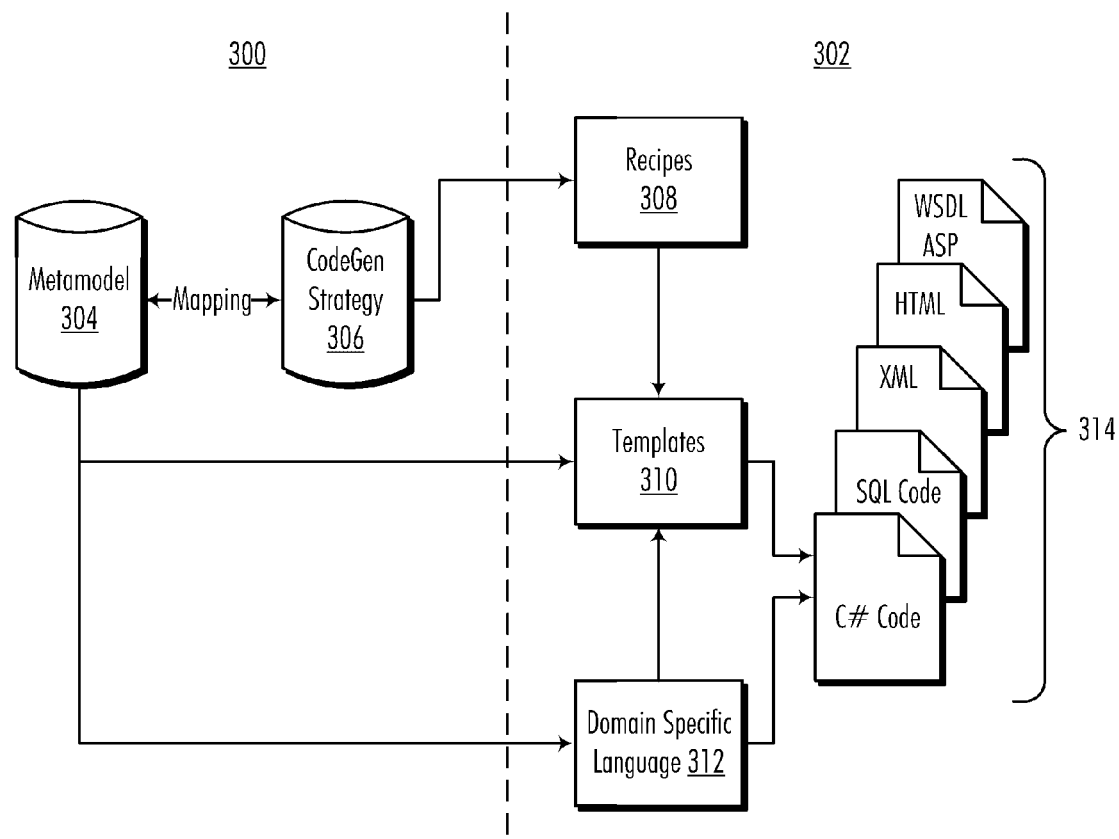
FIG. 3 is a diagram illustrating the mapping of a metamodel into a code generation strategy in accordance with a preferred embodiment of the present invention.

FIG. 2 is a diagram illustrating a process of developing a software system in accordance with a preferred embodiment of the present invention and representative actors and automated sub-processes in such a process. In a nutshell, FIG. 2 describes a preferred process for generating the software product described in FIG. 1. This process is supported by and automated by a computer-aided software engineering (CASE) tool that is diagrammed in FIG. 3. A preferred user interface for this tool is described in FIGS. 4-11.

Turning now to the contents of FIG. 2, the process is generally initiated by a subject matter expert or business analyst 200, whose primary responsibility it is to define a functional specification for the business the software is being developed form (block 202). This specification is entered into the CASE tool, as illustrated in FIGS. 4-11. There are two primary components to the business's functional specification, "concepts" 204 and "specifications" 206. Concepts 204 describe the characteristics of the business and requirements of the software without regard for formal technology-centered modeling. Concepts are obtained by identifying the key users of the business technology, and the predominant business scenarios, workflows and lifecycles, as well as the interactivity between those areas. Concepts 204 form a basis for defining specifications 206, which are more formal, albeit platform- and technology-independent, model of the software requirements. Specifications 206 take a more granular approach to discussing the detailed business objectives by identifying the key entities, activities, user interactions, and activity flows, as well as the interactivity between these areas. In some instances, specifications may be defined in terms of object-oriented models (in UML, for instance), while in other instances, specifications may be defined in a domain-specific language (i.e., a language specifically design to express data or instructions relating to a particular problem domain). From the concepts 204 and specifications 206, documentation 210 (including modeling diagrams—in UML, for instance) and other artifacts of the development process intended for human consumption may be automatically generated 208.

Where legacy systems and applications exist that might serve as a basis for the application to be developed, a preferred embodiment of the present invention includes software for introspecting database schemata, web services definitions, executable code (including dynamically-linked libraries or "DLLs") or other technology resources that support introspection, source code, XML (extensible Markup Language) documents, and other sources of metadata and importing the metadata into the new application's functional specification (block 202). This is important for two primary reasons: First, it allows the new application to be developed more quickly by leveraging the design features of existing applications and systems. Secondly, it allows the new application to be constructed in such a way as to allow it to interact with those legacy systems and applications.

Another feature that is provided in a preferred embodiment of the present invention to assist in the beginning stages of development is a metamodel template facility. Rather than starting from scratch with an empty functional specification, a "metamodel template" can be loaded from disk or other data storage and used as the skeleton for a new metamodel. For example, where the project is to build a medical billing application, a generic "billing" metamodel template, containing generic billing-related concepts, specifications, code generation strategies, and the like, can be loaded into the CASE tool. Libraries of metamodel templates specific to particular industries or applications may be maintained. Additionally, a developer may extract selected features from one or more metamodel templates and imported these extracted features through a drag-and-drop interface into the current software project metamodel. The reader should note that "metamodel templates" are different from "templates," defined below, which are used in code generation.

The logical "next step" in the process is to build a "reference application" or partial prototype for the application (block 222). This task would normally be undertaken by a senior developer 220, someone with extensive programming expertise. The reference application would not contain all functionality of the final product, but contain only a representative subset of those features which could serve as a model for the remainder of the application. Having an experienced senior developer develop the reference application allows the entire development team to leverage the skills of the senior developer by systematically (and, as will be seen, automatically) using the reference application to generate most, if not all, of the remaining features in the final application.

Senior developer 220's two tasks in developing the reference application are first, to use good design judgment to construct the reference application in a manner that makes its constituent pieces relatively easy to duplicate and second, to generalize the reference application code to form recipes (block 224) and templates (block 226) that can be used for automatic code generation. Templates are source code documents in containing embedded conditional code that is executed prior to compilation (i.e., during the code generation process). The source code generated from a template consists of the non-embedded-code portions of the template (i.e., the "base" code of the template) with the embedded-code portions removed and, as determined by the results of executing the embedded code, replaced with appropriate source code to implement whatever customizations of the base code are required. Recipes, on the other hand, are executable sequences of operations that may include the application of one or more templates. In short, templates form the basis for the generated code, recipes direct how the templates are to be used (and, for example, which values should be applied to various template parameters). The recipes and templates developed through the creation of the reference application (block 222) are deposited into a code generation pattern library 228 maintained by the CASE tool. One or more recipes and/or templates that function together as a unit to generate a portion of source code are called a code generation pattern (or simply, pattern).

Senior developer 222 may include analyzer code within the templates and recipes for execution in conjunction with code generation. This analyzer code would analyze those portions of the software project's metamodel pertaining to that template or recipe to determine whether the pre-requisites for applying that template or recipe are satisfied by the metamodel. If the prerequisites are not met, the developer attempting to apply the recipe or template is notified.

The next stage of the process in FIG. 2 is to map specifications 206 to a code generation strategy 212. This process, although performed using the CASE tool would normally be overseen by a software architect 214—ideally a person with a higher degree of familiarity with computer software technology than a business analyst, but perhaps less expertise than a senior developer. This stage is described in more detail in FIG. 3.

In this stage, a code generation strategy 306 is formulated and mapped to the individual specifications contained in metamodel 304. More specifically, code generation strategy 306 maps specifications from metamodel 304 to appropriate recipes 308 from the pattern library 228. Recipes 308 are instructions that direct the application of templates 310 and the interpretation (312) of any domain-specific languages (DSLs) used in a specification during the source code generation phase. The result of executing recipes 308 is the creation of source code 314.

Returning now to FIG. 2, the proper mapping between specifications and patterns (or, more specifically, the recipes that implement the patterns) must take into account aspects of the desired target technology 214 (i.e., the patterns chosen must work when compiled and executed on the target technology). Also, some of the more specific implementation details 216 must be chosen at this stage. For instance, if a specification calls for a particular piece of data to be an integer within a certain minimum and maximum range, the appropriate data type in the target language and computing platform must be chosen for that data (e.g., a selection among the "int," "long," "unsigned int," and other integer types must be made if the target language is C, and the choice of which one is appropriate under the circumstances will depend on the type of computer and C compiler used).

Once the specifications have been mapped to a code generation strategy (block 212), source code 232 is generated automatically from the code generation strategy, recipes, templates, and DSL code (block 230). Source code 232 may be customized, specialized, or extended manually by an application developer 236, as needed or desired, so as to arrive at a final version of the source code 238, which is suitable for compiling into an executable program.

In a preferred embodiment of the present invention, the generated source code 232 is divided into portions such that certain of the portions of source code 232 are denoted as "subject to regeneration" and others are denoted "not subject to regeneration." This allows those portions of source code 232 denoted "subject to regeneration" to be regenerated in the event that the software's metamodel changes, while portions denoted "not subject to regeneration" remain unchanged. This allows a human developer to include hand-written code in the "not subject to regeneration" portions that will not be overwritten in the event that source code 232 is regenerated. This approach to code generation is referred to as "active code generation" in the software engineering literature.

In a preferred embodiment of the present invention, the basic process described in FIG. 2 can be adapted so as to conform to a customized organizational methodology, which incorporates an organization's entire business process for developing a software product. In a preferred embodiment of the present invention, a facility for defining and supporting an organization's methodology is provided in software, and the various activities, artifacts, and formal documents associated with the software project are organized with respect to that methodology, as depicted in FIG. 4.

Figure 4:
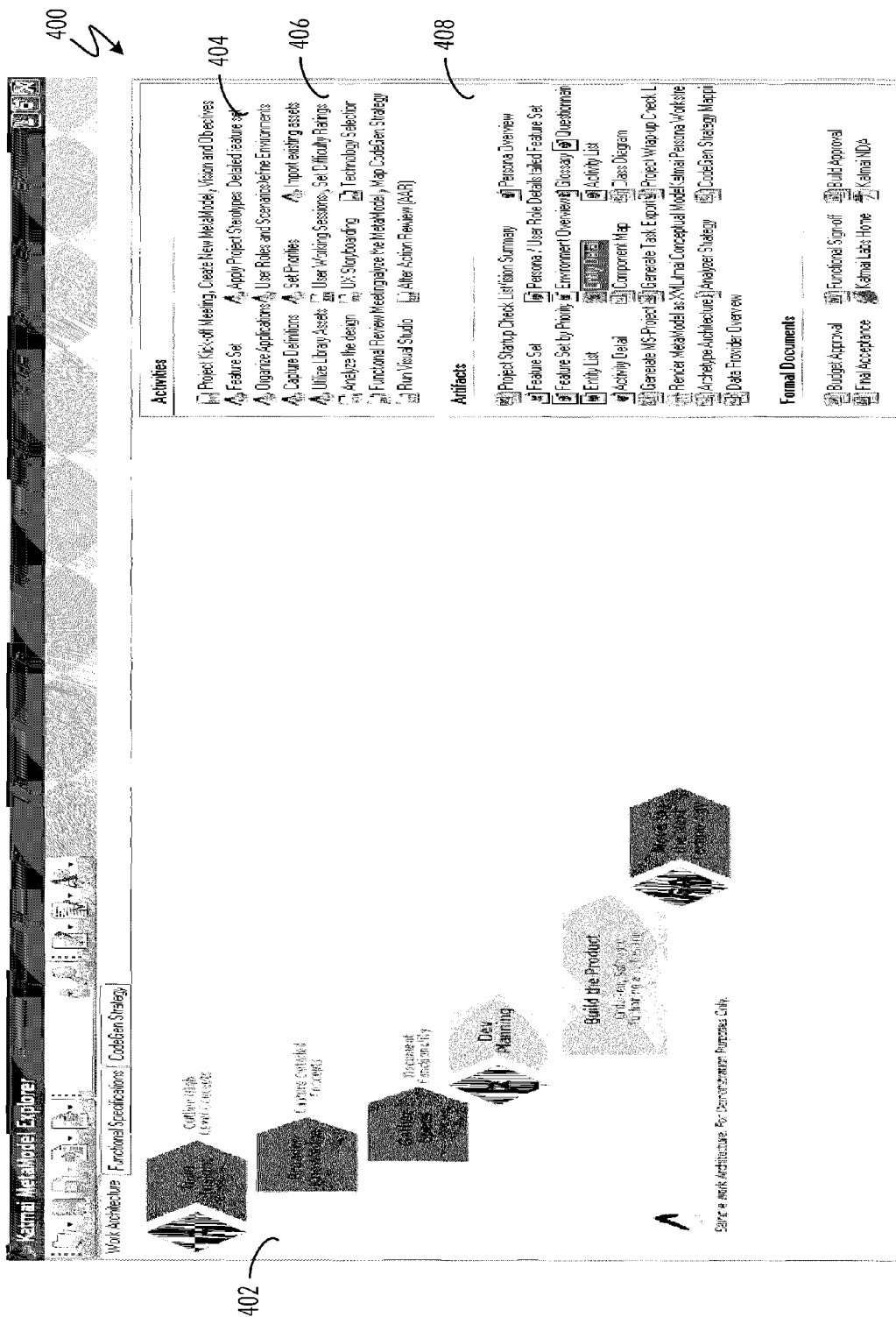
FIGS. 4-11 are screenshot diagrams illustrating a user interface for and operation of a modeling and code generation tool in accordance with a preferred embodiment of the present invention.
Figure 5:
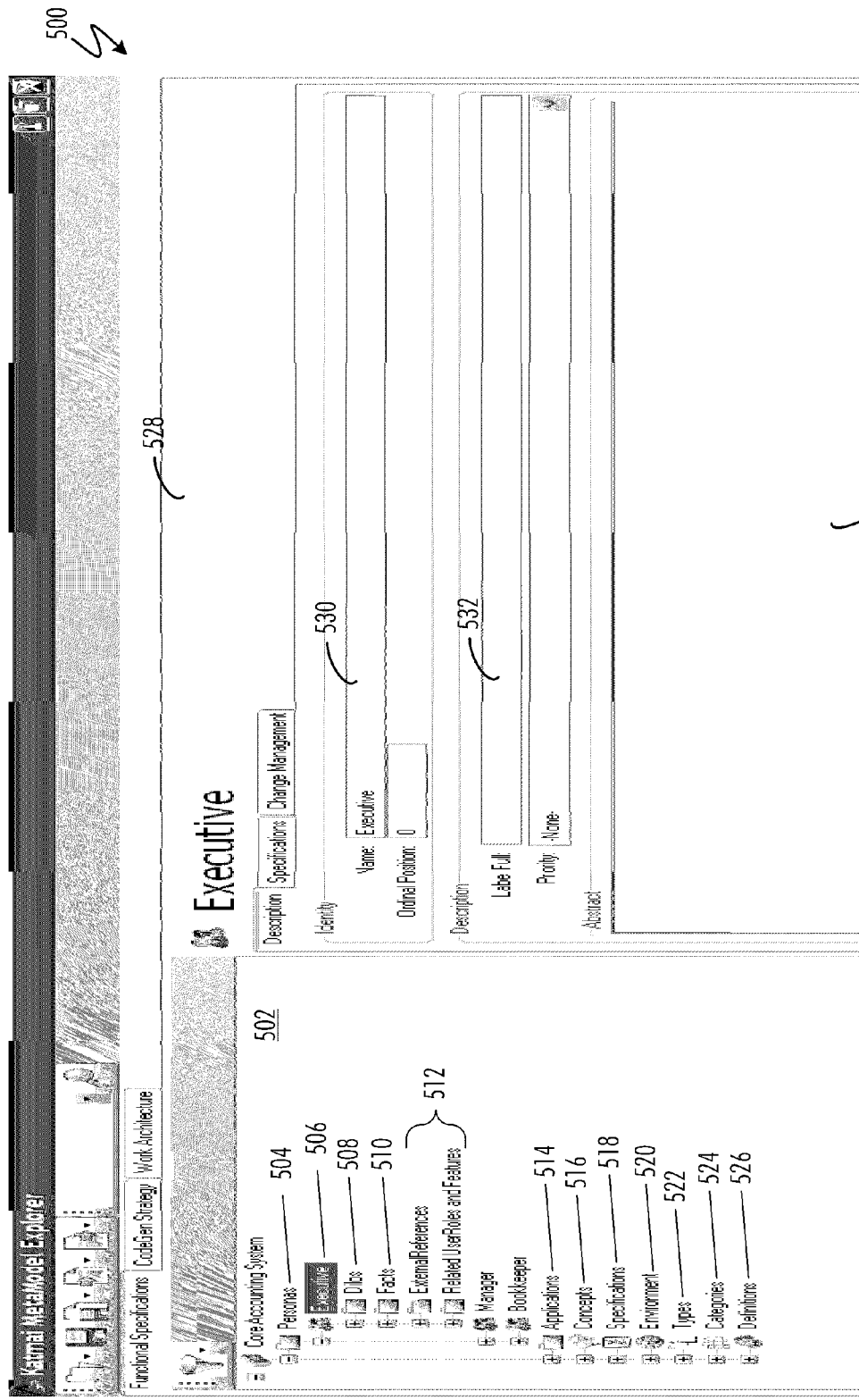

FIGS. 4-10 are screenshot diagrams illustrating a user interface for and operation of a modeling and code generation tool (heretofore referred to as the "CASE tool") in accordance with a preferred embodiment of the present invention. FIG. 4 shows the CASE tool window 400 displaying project management user interface.

The project management user interface allows the user to define the milestones, timeframes, tasks, sub-tasks, and resources necessary to build the software product defined in the functional specifications. Conceptually, detailed business objectives, concepts, and definitions are captured in the functional specifications. These functional specifications are associated with the tasks and sub-tasks required to deliver the system. These tasks and sub-tasks are directly linked with user role scenarios (also referred to as "user stories") and features.

Project management is organized by project milestones, which are user-defined key events in the project's delivery lifecycle. Each milestone contains one or more timeframes, which are the logical iterations of work (also referred to as "sprints") performed on the project. Tasks are organized within each timeframe or as sub-tasks within higher-level tasks. Resources are defined independently and then assigned on a task-by-task basis. Every task has a single resource specified as owning the responsibility for successful completion. Timeframes, tasks, and resources are assigned units of effort associated with the user-defined management preferences. Units of effort may be hours, days, weeks, months, function points, or agile story points.

An "analyzer" component verifies the proper assignment of functional specifications to tasks and also tracks effort against the task as compared to the allocated timeframes. Reports of these comparisons may be generated and reported as an artifact through the project management user interface. The analyzer further validates the metamodel against a set of analysis rules to verify completeness of the functional specifications, accuracy of code generation strategy mapping, and compliance with best practice standards associated with the employed methodology. In addition to reporting the results of its analysis, the analyzer may also suggest modifications to the metamodel to correct possible errors (latent and patent) and to support best practices. If desired, the analyzer can be directed to make certain suggested changes automatically.

Turning now to the specifics of FIG. 4, the steps in an organization's methodology are represented in the left-hand panel 402 of window 400. A user may click on any of these steps to display artifacts 404, activities 406, and formal documents 408 related to that step. Double-clicking on any of artifacts 404 (such as program documentation), activities 406, or formal documents 408 (such as formal specifications) will cause the selected artifact, activity or formal document to be presented to the user.

FIG. 5 again shows the CASE tool window 500, which contains an expandible/collapsible hierarchical tree widget 502 on the left hand side of window 500, which allows the user to graphically navigate the metamodel and its contents. The right hand side of window 500 contains a tabbed editing/viewing region 528 for viewing or editing the nodes in the metamodel hierarchy. Here, the "Description" tab is enabled, so fields are provided to allow the name (530), brief description (532), and narrative abstract (534) of the currently selected node in hierarchy 502 (node 506 in FIG. 5) to be viewed or edited. Every node in the metamodel may have a name, description, and abstract.

Turning now to the structure and contents of the metamodel, the first classification in the hierarchy is labeled "Personas." A persona (sometimes loosely referred to as "user category" or "user group") is the role that a representative group of people fulfill within an organization. This definition includes business and organization responsibilities in a general sense, but more important to the functional specification are the descriptions of the end user roles associated with this Persona. In this example, three such personas are defined, "Executive," "Manager," and "Bookkeeper." Each persona may be associated with one or more "DILOs" ("Day In the Life Of") 508 to describe that person's duties within the organization, as well as other facts regarding that particular persona 510. Moreover, a persona, as with the other types of nodes in the metamodel, may reference other nodes in the metamodel so as to model relationships that node has with others. Other classifications include applications 514, concepts 516, specifications 518, environment 520, types 522, categories 524, and definitions 526, which dealt with in more detail in the figures that follow.

Figure 6:
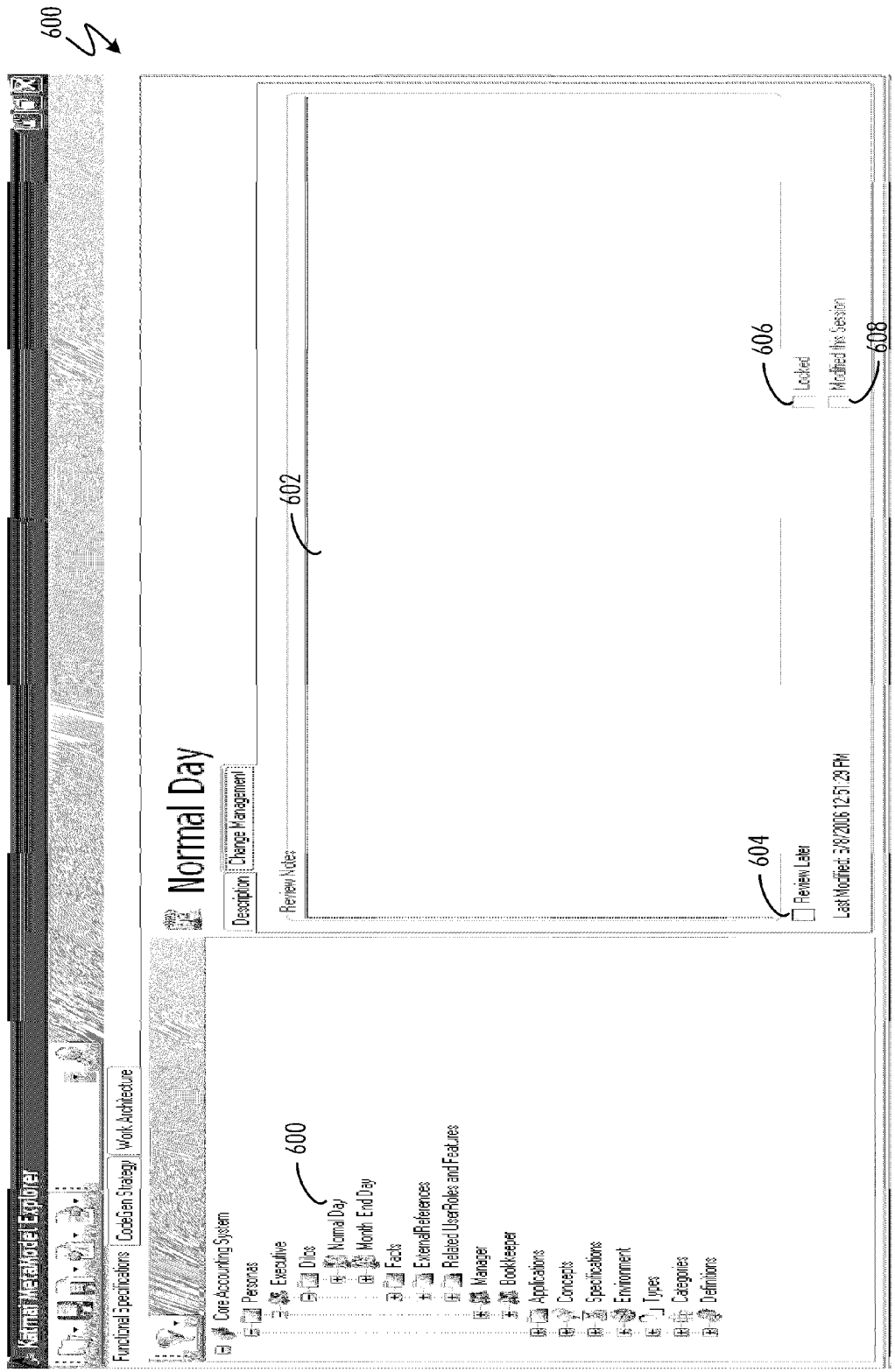

As shown in FIG. 6, change management and access control are also implemented in the tool. Under the change management tab, a space is provided for review notes (regarding changes/updates that were made or that need to be made) 602 and the notes can be flagged for later review (checkbox 604). If a node in the metamodel is locked (either because the particular user does not have change-access rights to the node or because someone has locked the node to keep it from being changed by other, this is indicated by a checkbox 606. If a modification was made during the user's current session with the tool, this is also indicated by a checkbox 608. In a preferred embodiment, facilities for version control (configuration management) and version history logging are also provided.

Figure 7:
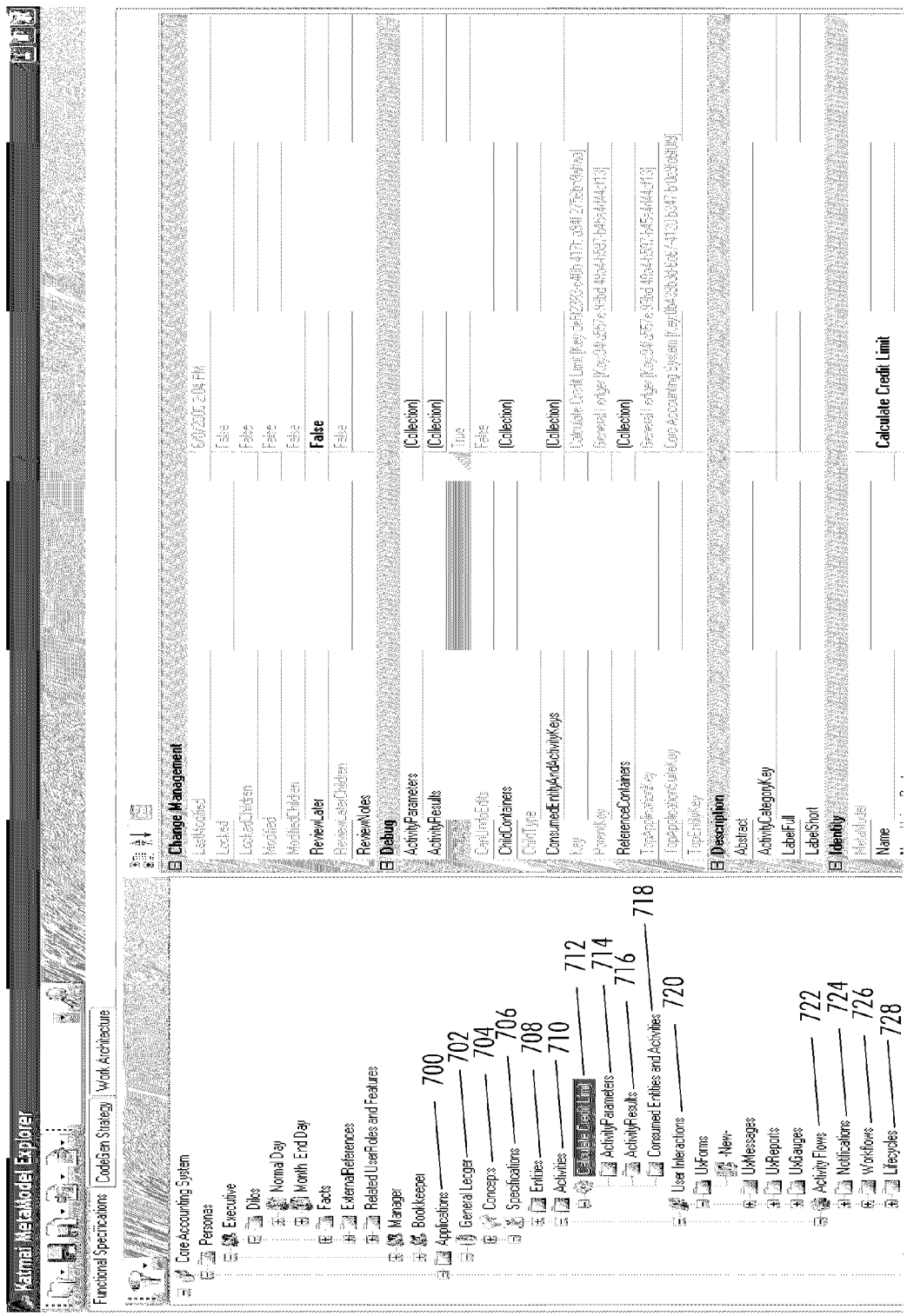
Figure 8:
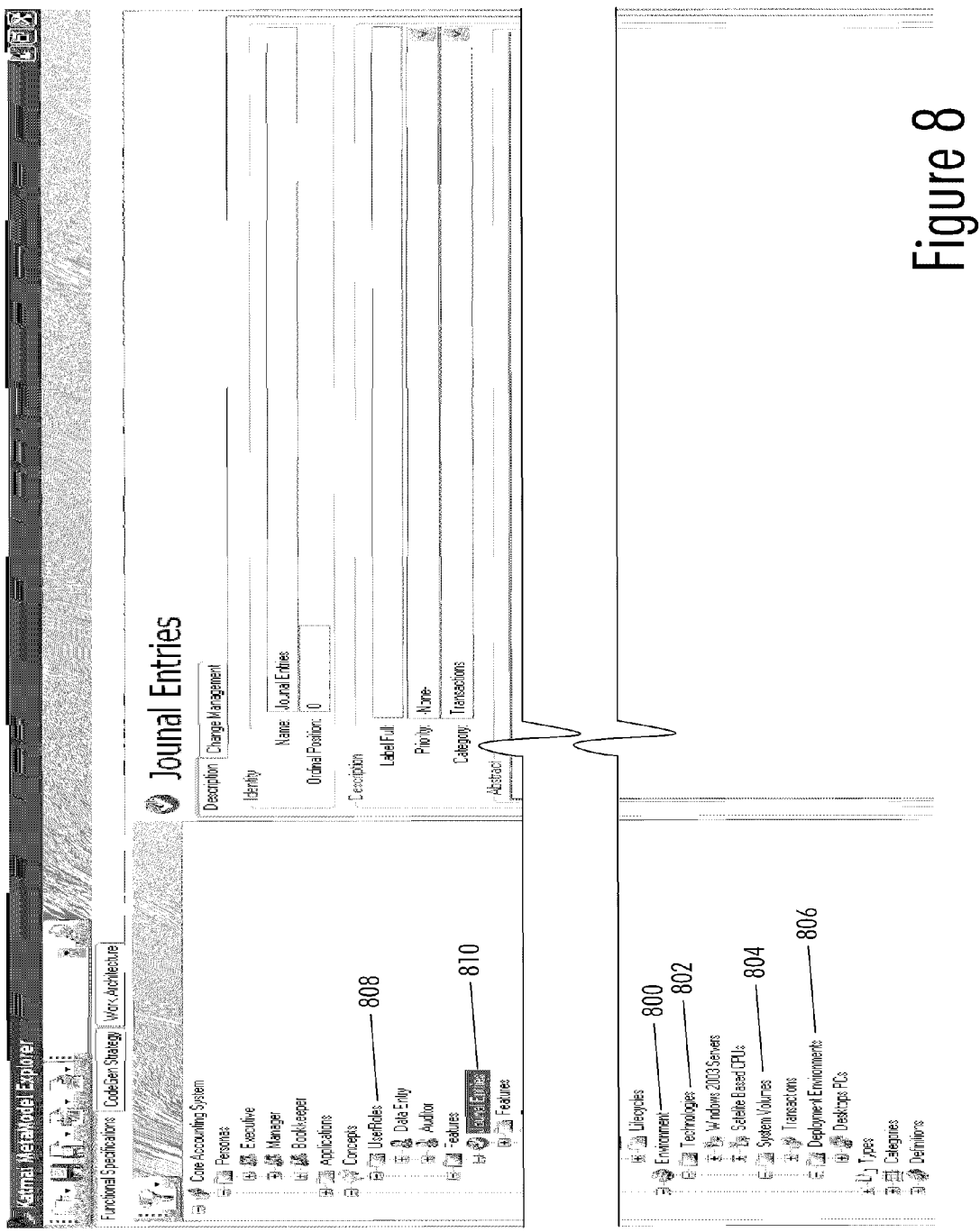
Figure 9:
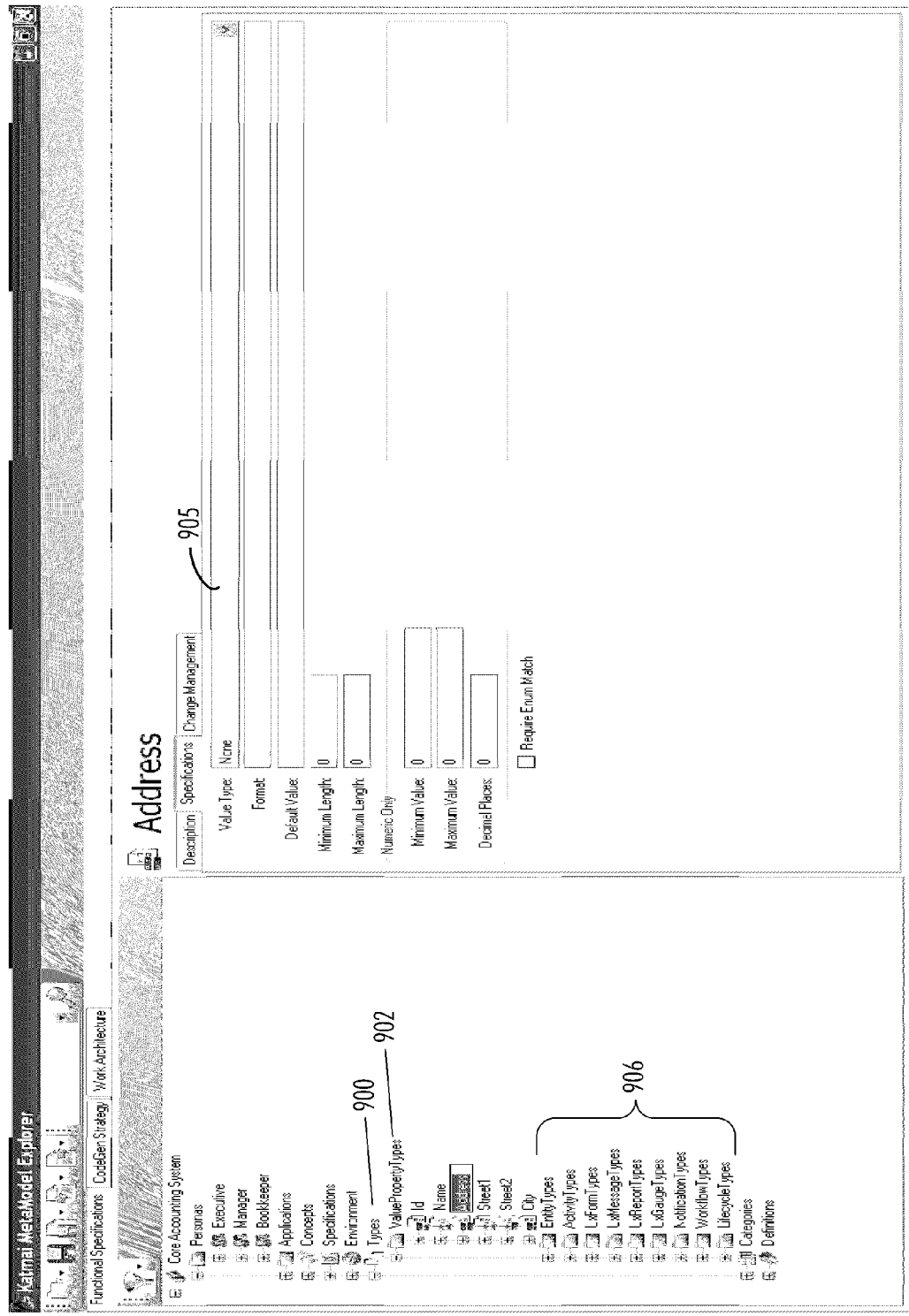

Turning now to FIG. 7, the applications category 700 is shown in more detail. Applications are the logical organization of scope for a well defined set of concepts 704 (user roles, features and scenarios—e.g., user roles 808 and features 810 in FIG. 8) and specifications 806 (entities 808, activities 810, user interactions 720, and activity flows 722) describing a software product. Typically, applications encapsulate closely related sets of feature-functionality that can be thought of as a standalone software product or as a component of a tightly integrated suite of applications. The application shown in this example is called "General Ledger" 702.

Entities describe the logical grouping of related business data into well organized inter-related containers. These objects contain properties (also referred to as fields or columns) which describe the detailed data within each entity. Associations (relationships) between entities are defined on a granular basis. Entities may be defined at the application suite (top) level of the metamodel or at the application level, or they may be owned within other entities recursively. Entities contained within another entity are said to be dependent entities and are owned by the highest level entity within its hierarchy. Entities may optionally have entity indices defined. These entity indices are summarized subsets of properties which may be used for retrieving a specific entity or lists of entities. An entity index is analogous to a "key" in relational database theory.

Associations define the relationships between entities (in the sense of entity-relationship modeling, as practiced in the database design field). Entities are associated by relating the indices between two entities that create the basis for the relationship. The properties of the related indices must match in number and type to enable the association to be valid. Every association has a parent (or owning) entity, which is related to a child (or owned) entity. Associations may be "compositions" which are tightly bound relationships in which the child can only exist within the context of the parent (i.e., the child is a "weak entity"). Alternatively, associations may be "aggregations," which are standalone entities whose simultaneous use requires a tightly bound relationship. Compositions are defined using the child entity hierarchy contained within the parent entity. Aggregations are defined using explicit association definitions. For each association, ratios of multiplicities (cardinalities) are defined (one-to-one, one-to-many, many-to-many). In a preferred embodiment, the multiplicity of the parent entity is assumed to be "one," with the multiplicity of the child entity being "one," "zero or one," "zero to many," or "one to many."

As is provided in many relational database systems, a "view" of one or more entities may be defined. A view is a summarized subset of properties that may be retrieved for a list of one or more entities.

An activity is a unit of business logic that is contained within a software product. It may be executed directly by a program or incorporated as a step in an activity flow (notification, workflow, or lifecycle). The components of an activity (e.g., activity 712) consist of (a) parameters 714, also referred to as input properties or entry conditions; (b) self-contained business logic 718, which may involve complex data manipulations; and (c) the results 716, also referred to as output properties or exit conditions.

Analogous to activities are external services (e.g., external services 142 in FIG. 1). A service is a unit of business logic or capability that is either external to the software product or must be treated as an isolated component. As with activities, the components of an external service consist of (a) parameters; (b) self-contained business logic; and (c) results.

User interactions (e.g., user interactions 720) are dynamic points of contact between the user and the software product. These interactions are classified into four logical areas, as was described in conjunction with FIG. 1, above.

Activity flows 722 describe the flow or progress of work done by the software product. These flows depend on activities for each step in the flow and may be both conditional and long running in nature.

The three high level classification of activity flows are:
1) Notificiations. (724) These flows are started by an external event and involve the execution of one or more Activities. Notifications may cause the execution of other Activity Flows. The documentation for a Notification consists of (a) a business objective—why it exists, (b) an entry point event—how does it get started, and (c) a result—what is the final state inside the software product after the Notification is executed.
2) Workflows. (726) These flows describe the movement or progress of work done by the software product that is normally long running in nature and is impacted by multiple User Roles and Scenarios. The documentation for a Workflow consists of (a) a business objective—why it exists, (b) a process flow—showing each software only step and calculation, as well as the Scenario interaction points, and (c) a result—what is the final state inside the software product after the Workflow is executed.
3) Lifecycles. (728) These flows describe a large scope of data within a software product progressing through a series of differing stages driven by consistent time cycles. This progression is normally of a system wide scope such as (A) describing recurring patterns within accounting periods, quarters and fiscal years, or (B) defining regular intervals of large scale data import/export mechanisms. The documentation for a Lifecycle consists of (a) a business objective—why it exists, (b) the timeframe for the overall Lifecycle plus any embedded cycles, and (c) the results—what are the states inside the software product after each stage of the Lifecycle is executed.

The "Environment" section of the metamodel (800) contains key facts related to the environment in which an application suite will be physically deployed and consumed by users and in which it will execute. The environment is sometimes referred to as the "physical environment," "execution environment" and/or "deployment environment".

The key pieces of information recorded in this section include:
1. Technologies. (802) The various technology components on which the application suite will be executed, or upon which it is dependent.
2. System Volumes. (804) The relevant transaction, database, transmission, bandwidth and/or other material capacity measurements requiring optimization in order for the application suite to execute effectively.
3. Deployment Environment. (806) The various technologies employed or required to allow users to interact with the application suite. These may include desktop, laptop, mobile device specifications, as well as server and gateway considerations if not already included in the technologies section.

Types 900 (FIG. 9) are required custom-defined mechanisms for grouping together similar specifications for well defined behavior during code generation. Types act as the links to the code generation strategies defined for each specification. A type may be mapped to various language syntax mappings (such as C#, SQL, Oracle, etc.), technical implementation mappings (such as Office 12 Smart Client, SharePoint, Vista-XAML, etc.), recipes, and templates.

Value property types 902 may be utilized for grouping value property (such as entity properties and activity properties) specifications. A value property has scope for the entire application suite and describes a language-independent higher level of abstraction for defining data types.

As an example, an "Email" value property type could be defined once and utilized throughout the specifications—from entities to activities to user experience, etc. All of the information regarding the attributes of the "Email" (constraints, primitive data types, formatting, user experience behavior, etc.) are defined once (e.g., in edit area 905) and perpetuated throughout the specifications and code generation.

A value property type may represent either a primitive data type (as in the example above) or a compound value property type. An example of a compound type is an "Address" which may consist of street address lines, city, state, postal code, country, etc. This "Address" may be defined once and used throughout the specifications as a single property type. When code generation occurs the type is expanded into its component parts automatically.

Other higher-level aspects of the metamodel are also associated with types 906. These higher-level constructs are defined similarly.

Figure 10:
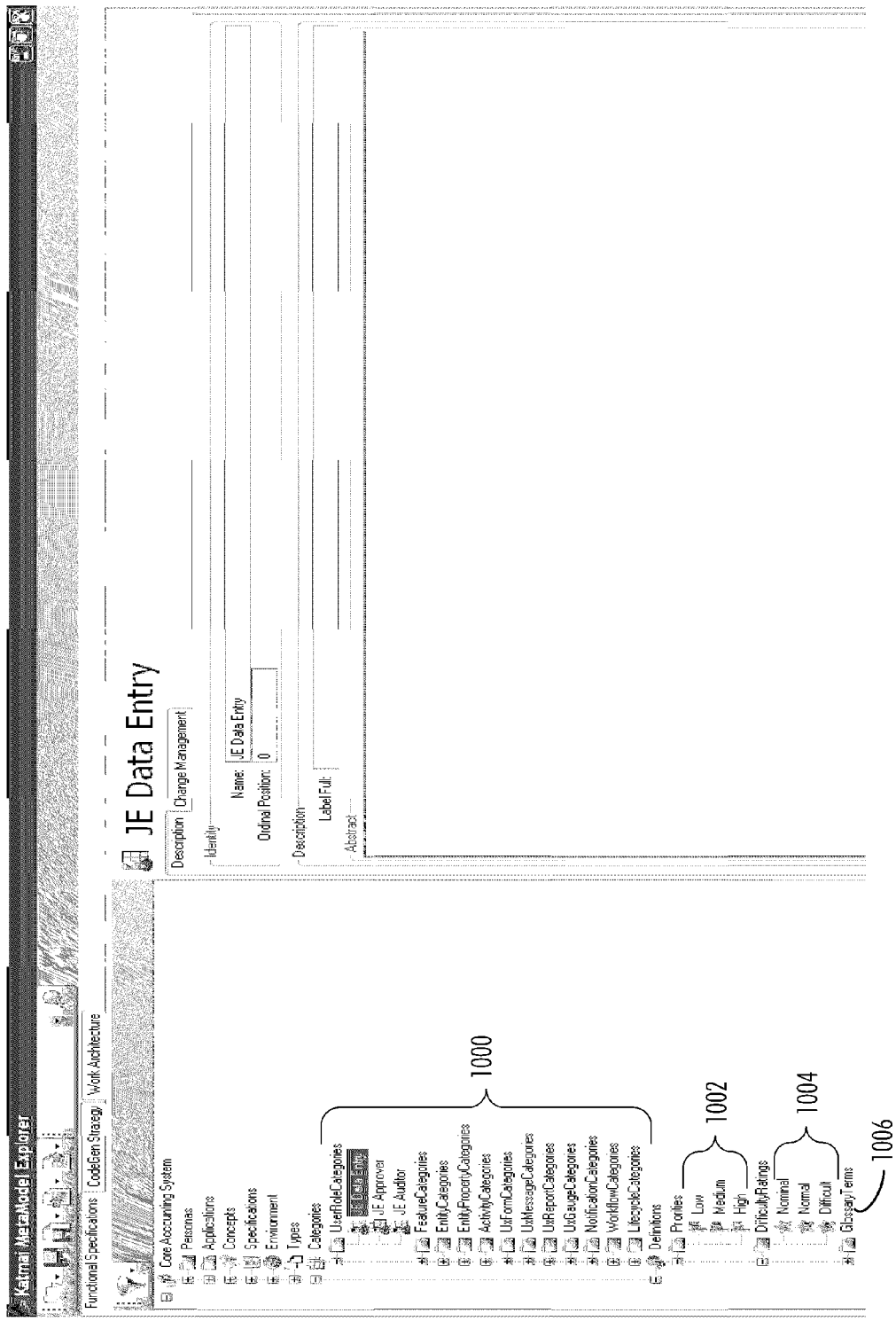

The final sections of the metamodel, shown in FIG. 10, are categories 1000 and definitions (1002-1006). Categories are optional custom defined mechanisms for grouping together similar concepts and specifications for convenient combined review and reporting. Categories are merely for convenience of presentation and have no effect on code generation. The definitions section allows a user to provide generic definitions of things such task priorities 1002, difficult levels of tasks 1004, and miscellaneous terminology employed through a software system 1006.

Figure 11:

FIG. 11 shows a user interface for mapping specifications to recipes to form code generation strategies in accordance with a preferred embodiment of the present invention. In a left-hand side hierarchical navigation widget 1100 are represented various code generation strategies for an application suite/software system. Each strategy is associated with a target technology platform. For example code generation strategy 1101 is associated with the Vista platform. In this manner, various versions of the same software system may be generated for different platforms from the same specifications. Code generation strategy 1101 is organized hierarchically according to the different layers (1102, as well as those contained in 1104) in the target software system.

Each layer may have one or more "maps," as does layer 1102 in this example. Each map associates specifications from the metamodel with recipes for generating source code in compliance with those specifications. In this example, map 1106 is currently selected. Fields are provided to allow the user (developer) to supply a text abstract 1108, identify the appropriate recipe to use 1110 and any other information necessary to associate the recipe with the map 1112. Additionally, fields 1114 and 1116 are provided to allow named recipe parameters to be filled with or appropriate values. Once all of the maps have been fully specified for the software system, source code can be generated automatically.

Figure 12:
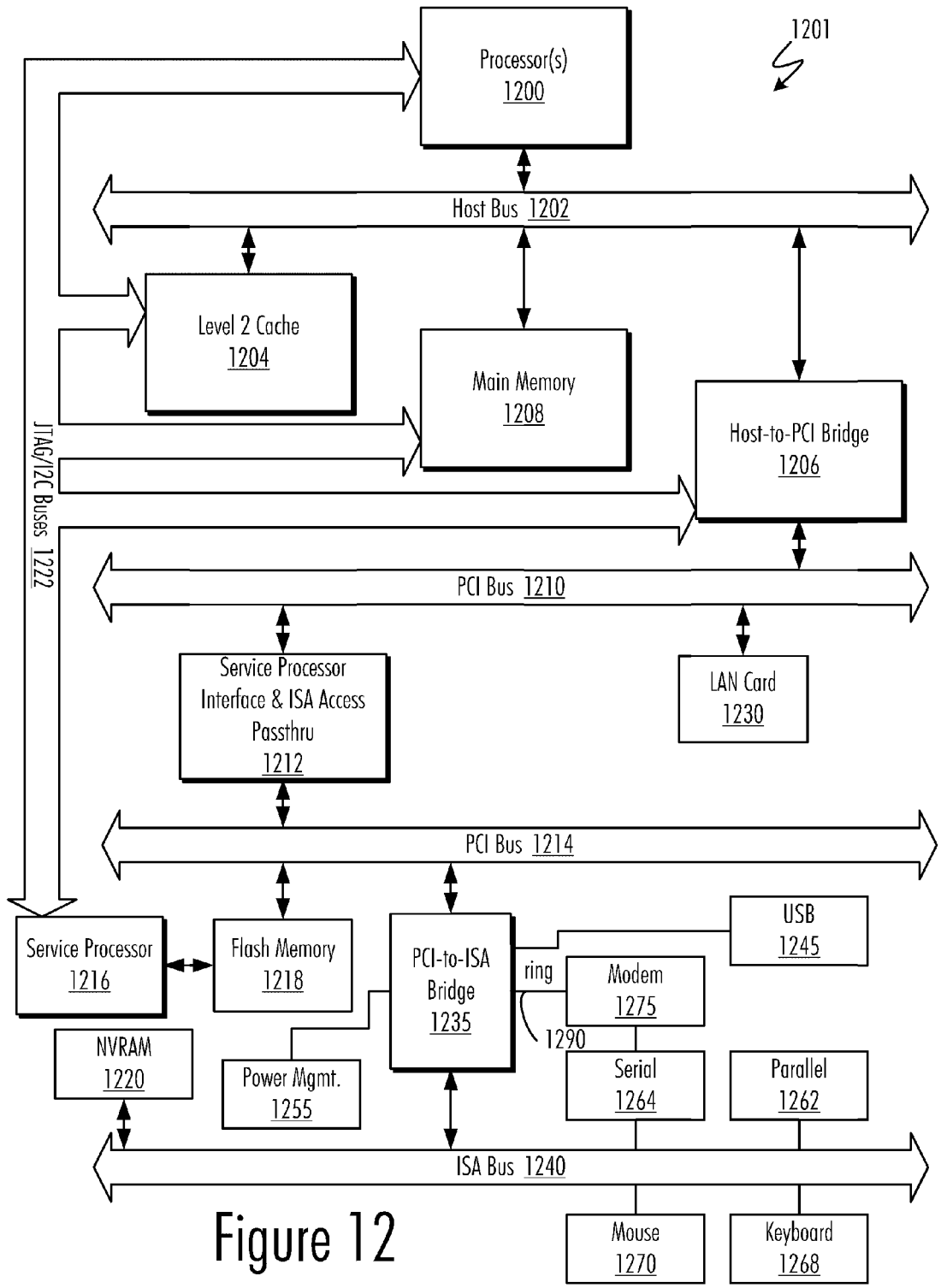
FIG. 12 is a block diagram of a data processing system in which a preferred embodiment of the present invention may be implemented.

FIG. 12 illustrates information handling system 1201 which is a simplified example of a computer system/data processing system capable of performing the computing operations described herein with respect to a preferred embodiment of the present invention. Computer system 1201 includes processor 1200 which is coupled to host bus 1202. A level two (L2) cache memory 1204 is also coupled to host bus 1202. Host-to-PCI bridge 1206 is coupled to main memory 1208, includes cache memory and main memory control functions, and provides bus control to handle transfers among PCI bus 1210, processor 1200, L2 cache 1204, main memory 1208, and host bus 1202. Main memory 1208 is coupled to Host-to-PCI bridge 1206 as well as host bus 1202. Devices used solely by host processor(s) 1200, such as LAN card 1230, are coupled to PCI bus 1210. Service Processor Interface and ISA Access Pass-through 1212 provides an interface between PCI bus 1210 and PCI bus 1214. In this manner, PCI bus 1214 is insulated from PCI bus 1210. Devices, such as flash memory 1218, are coupled to PCI bus 1214. In one implementation, flash memory 1218 includes BIOS code that incorporates the necessary processor executable code for a variety of low-level system functions and system boot functions.

PCI bus 1214 provides an interface for a variety of devices that are shared by host processor(s) 1200 and Service Processor 1216 including, for example, flash memory 1218. PCI-to-ISA bridge 1235 provides bus control to handle transfers between PCI bus 1214 and ISA bus 1240, universal serial bus (USB) functionality 1245, power management functionality 1255, and can include other functional elements not shown, such as a real-time clock (RTC), DMA control, interrupt support, and system management bus support. Nonvolatile RAM 1220 is attached to ISA Bus 1240. Service Processor 1216 includes JTAG and I2C buses 1222 for communication with processor(s) 1200 during initialization steps. JTAG/I2C buses 1222 are also coupled to L2 cache 1204, Host-to-PCI bridge 1206, and main memory 1208 providing a communications path between the processor, the Service Processor, the L2 cache, the Host-to-PCI bridge, and the main memory. Service Processor 1216 also has access to system power resources for powering down information handling device 1201.

Peripheral devices and input/output (I/O) devices can be attached to various interfaces (e.g., parallel interface 1262, serial interface 1264, keyboard interface 1268, and mouse interface 1270 coupled to ISA bus 1240. Alternatively, many I/O devices can be accommodated by a super I/O controller (not shown) attached to ISA bus 1240.

In order to attach computer system 1201 to another computer system to copy files over a network, LAN card 1230 is coupled to PCI bus 1210. Similarly, to connect computer system 1201 to an ISP to connect to the Internet using a telephone line connection, modem 1275 is connected to serial port 1264 and PCI-to-ISA Bridge 1235.

While the computer system described in FIG. 12 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A method to generate source code based on a metamodel comprising:
   providing the metamodel containing a specification of a software system consisting of declarative constructs corresponding to functional requirements and functional specifications for the software system, the declarative constructs defining structure, computation, and behavior logic without describing its control flow, the declarative constructs are entered via a CASE tool;
   generating a mapping between at least a portion of the metamodel and a code generation strategy, the code generation strategy independent of the metamodel and implemented at a different time than a creation of the metamodel, which includes implementation behavior and technical specifications, wherein the code generation strategy includes an identification of an appropriate code generation pattern from a library of code generation patterns, the library is maintained by the CASE tool; and
   generating source code, which is independent of both the metamodel and the code generation strategy, corresponding to said portion of the metamodel in accordance with the code generation strategy and the appropriate code generation pattern is utilized by the CASE tool.

2. The method of claim 1, wherein the metamodel includes at least one specification pertaining to the software system and said source code is generated so as to comply with said specification.

3. The method of claim 1, wherein said appropriate code generation pattern includes a template and said source code is generated using the template.

4. The method of claim 1, further comprising:
   selecting said code generation pattern from the library of code generation patterns based on a selection criterion of a target technology platform for the software system.

5. The method of claim 1, wherein providing the metamodel includes importing metadata from an existing source.

6. The method of claim 5, wherein the existing source is a database.

7. The method of claim 5, wherein the existing source is executable code.

8. The method of claim 7, wherein the executable code forms at least a portion of a dynamically-linked library (DLL).

9. The method of claim 5, wherein the existing source is a web service definition.

10. The method of claim 5, wherein the existing source is a metadata repository.

11. The method of claim 5, wherein the existing source is a design of a structured document or diagram with a structured data format.

12. The method of claim 5, wherein the existing source is source code in a programming language.

13. The method of claim 5, wherein the existing source forms at least a portion of a technology resource that supports a defined method of exposing its internal structure and behavior.

14. The method of claim 1, further comprising:
   validating the metamodel against one or more validation rules, wherein the validation rules validate the metamodel for completeness of function specification, for accuracy of code generation strategy mapping, or for compliance with best practice standards.

15. The method of claim 1, further comprising:
   providing a project management facility for organizing milestones, timeframes, tasks, or other resources associated with development of the software system.

16. The method of claim 15, wherein the milestones, timeframes, tasks, or other resources are organized according to a methodology, and wherein the task validation methodology utilizes best practices.

17. The method of claim 16, further comprising:
   generating a design document artifact from the metamodel according to the methodology.

18. The method of claim 1, further comprising:
   providing a set of metamodel templates; and
   deriving at least a portion of the metamodel from one or more of the metamodel templates.

19. The method of claim 1, further comprising:
   enforcing a set of metamodel access privileges with respect to a plurality of users, such that each user in the plurality of users may access the metamodel only to the extent allowed by the metamodel access privileges.

20. The method of claim 1, wherein providing the metamodel includes obtaining user input that defines at least some of the metamodel.

21. A computer program product in a computer-readable non-transitory medium comprising functional instructions that, when executed by a computer, directs the computer to perform actions to generate source code based on a metamodel that include:
   providing the metamodel containing a specification of a software system consisting of declarative constructs corresponding to functional requirements for the software system, the declarative constructs defining structure, computation, and behavior logic without describing its control flow, the declarative constructs are entered via a CASE tool;
   generating a mapping between at least a portion of the metamodel and a code generation strategy, the code generation strategy independent of the metamodel and implemented at a different time than a creation of the metamodel, wherein the code generation strategy includes identification of an appropriate code generation pattern form a library of code generation patterns, the library is maintained by the CASE tool; and
   generating source code, which is independent of both the metamodel and the code generation strategy, corresponding to said portion of the metamodel in accordance with the code generation strategy and the appropriate code generation pattern, the pattern is utilized by the CASE tool.

22. The computer program product of claim 21, wherein the metamodel includes at least one specification pertaining to the software system and said source code is generated so as to comply with said specification.

23. The computer program product of claim 21, wherein said appropriate code generation pattern includes a template and said source code is generated using the template.

24. The method of claim 21, further comprising:
   selecting said code generation pattern from the library of code generation patterns based on a selection criterion of a target technology platform for the software system.

25. The computer program product of claim 21, wherein providing the metamodel includes importing metadata from an existing source.

26. The computer program product of claim 25, wherein the existing source is a database.

27. The computer program product of claim 25, wherein the existing source is executable code.

28. The computer program product of claim 27, wherein the executable code forms at least a portion of a dynamically-linked library (DLL).

29. The computer program product of claim 25, wherein the existing source is a web service definition.

30. The computer program product of claim 25, wherein the existing source is a metadata repository.

31. The computer program product of claim 25, wherein the existing source is a design of a structured document or diagram with a structured data format.

32. The computer program product of claim 25, wherein the existing source is source code in a programming language.

33. The computer program product of claim 25, wherein the existing source forms at least a portion of a technology resource that supports a defined method of exposing its internal structure and behavior.

34. The computer program product of claim 21, comprising additional functional descriptive material that, when executed by the computer, causes the computer to perform actions of:
validating the metamodel against one or more validation rules, wherein the validation rules validate the metamodel for completeness of function specification, for accuracy of code generation strategy mapping, or for compliance with best practice standards.

35. The computer program product of claim 21, comprising additional functional descriptive material that, when executed by the computer, causes the computer to perform actions of:
providing a project management facility for organizing milestones, timeframes, tasks, or other resources associated with development of the software system.

36. The computer program product of claim 35, wherein the milestones, timeframes, tasks, or other resources are organized according to a methodology, and wherein the task validation methodology utilizes best.

37. The computer program product of claim 36, comprising additional functional descriptive material that, when executed by the computer, causes the computer to perform actions of:
generating a design document artifact from the metamodel according to the methodology.

38. The computer program product of claim 21, comprising additional functional descriptive material that, when executed by the computer, causes the computer to perform actions of:
providing a set of metamodel templates; and
deriving at least a portion of the metamodel from one or more of the metamodel templates.

39. The computer program product of claim 21, comprising additional functional descriptive material that, when executed by the computer, causes the computer to perform actions of:
enforcing a set of metamodel access privileges with respect to a plurality of users, such that each user in the plurality of users may access the metamodel only to the extent allowed by the metamodel access privileges.

40. The computer program product of claim 21, wherein providing the metamodel includes obtaining user input that defines at least some of the metamodel.

41. A data processing system comprising:
at least one processor;
storage accessible to the at least one processor; and
a set of instructions in the storage, wherein the at least one processor executes the set of instructions to perform actions to generate source code based on a metamodel, the actions:
providing the metamodel containing a specification of a software system consisting of declarative constructs corresponding to functional requirements for the software system, the declarative constructs defining structure, computation, and behavior logic without describing its control flow, the declarative constructs are entered via a CASE tool;
generating a mapping between at least a portion of the metamodel and a code generation strategy, the code generation strategy independent of the metamodel and implemented at a different than a creation of the metamodel, wherein the code generation strategy includes identification of an appropriate code generation pattern form a library of code generation patterns, the library is maintained by the CASE tool; and
generating source code, which is independent of both the metamodel and the code generation strategy, corresponding to said portion of the metamodel in accordance with the code generation strategy and the appropriate code generation pattern, the pattern is utilized by the CASE tool.

\* \* \* \* \*